Figure 1:
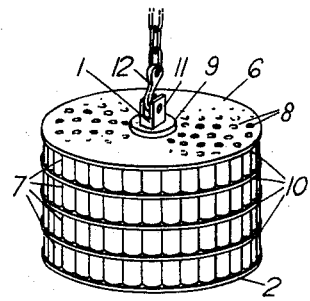

May 10, 1966  G. H. RAINBOW  3,250,208
CAN HANDLING
Filed April 7, 1964  11 Sheets-Sheet 1

Inventor
George Henry Rainbow
By
Attorneys

Inventor
George Henry Rainbow
By
Mason, Porter, Diller & Stewart
Attorneys

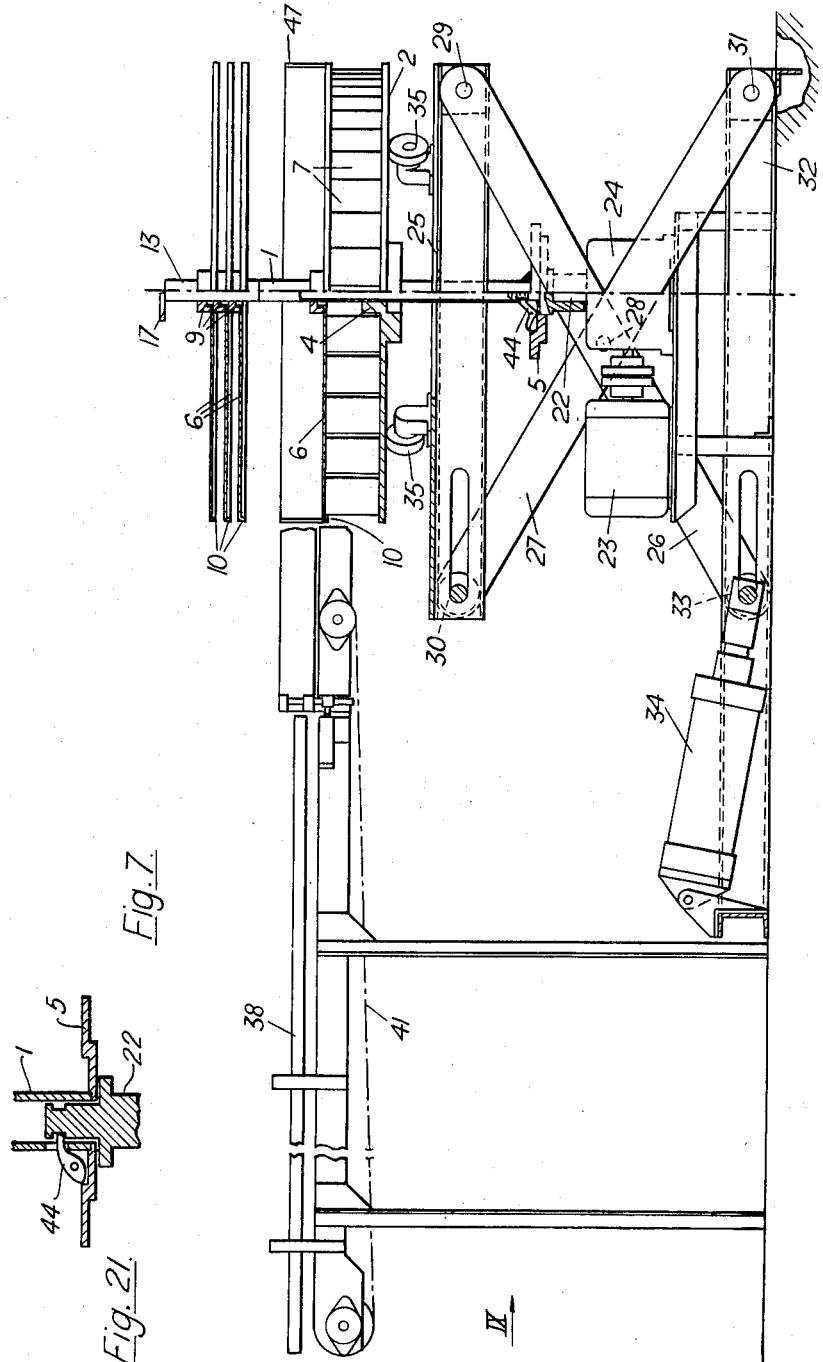

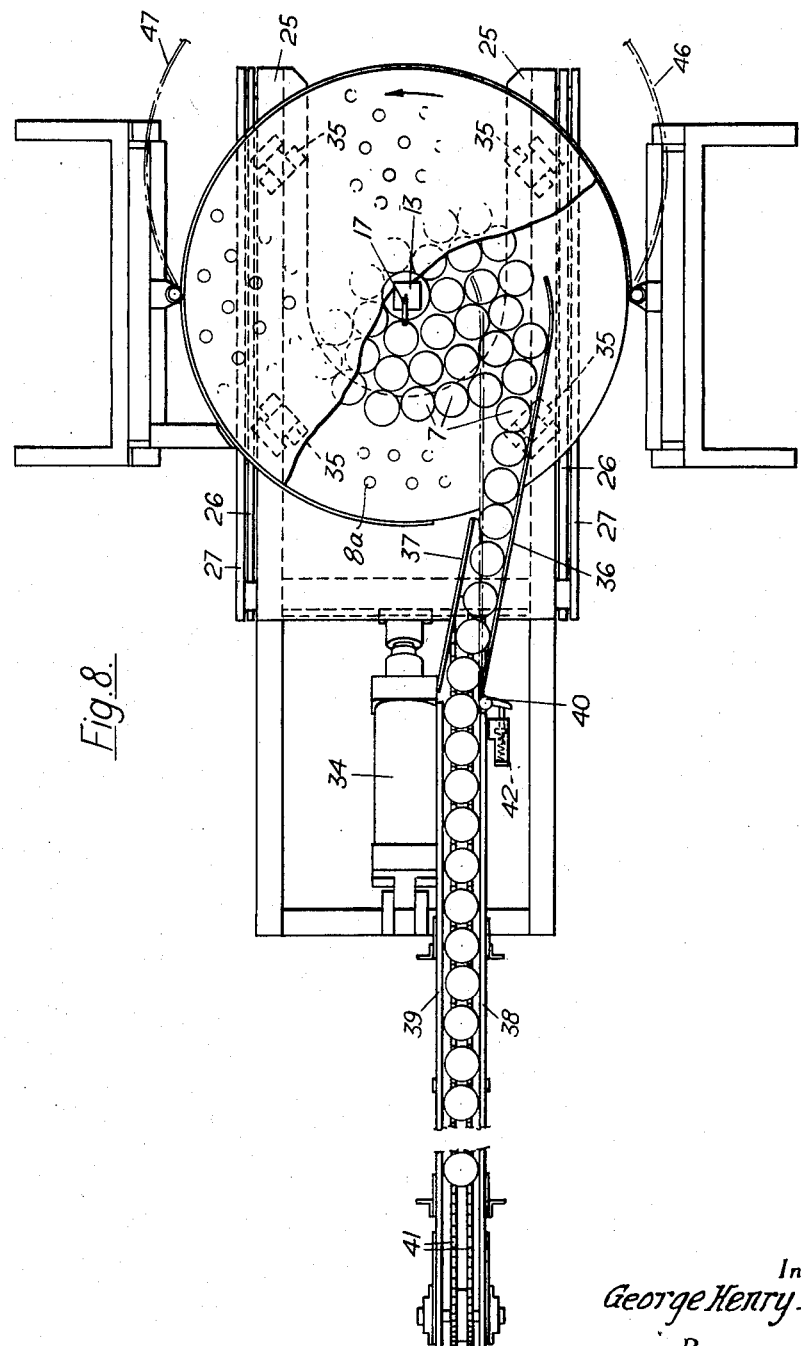

May 10, 1966  G. H. RAINBOW  3,250,208
CAN HANDLING
Filed April 7, 1964  11 Sheets-Sheet 5
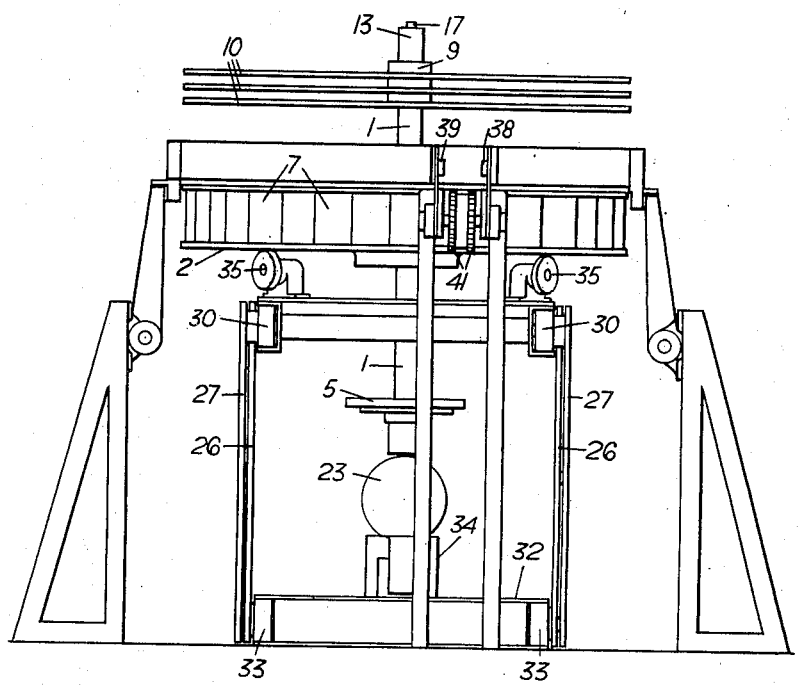
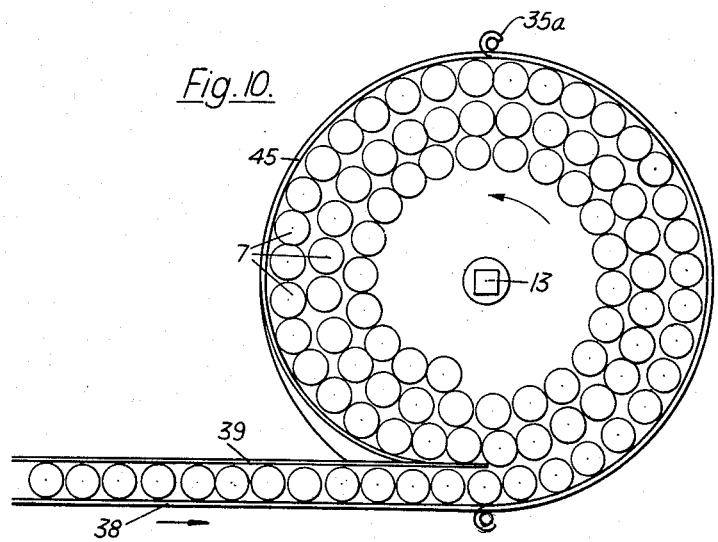
Inventor
*George Henry Rainbow*

May 10, 1966  G. H. RAINBOW  3,250,208
CAN HANDLING

Filed April 7, 1964  11 Sheets-Sheet 6

Inventor
George Henry Rainbow
By
Mason, Porter, Diller & Stewart
Attorneys

Inventor
George Henry Rainbow

Inventor
George Henry Rainbow

May 10, 1966  G. H. RAINBOW  3,250,208
CAN HANDLING
Filed April 7, 1964  11 Sheets-Sheet 9
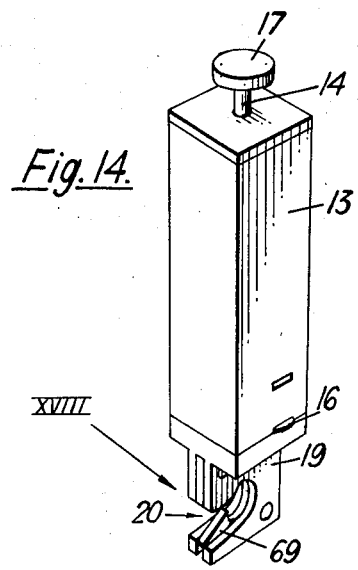
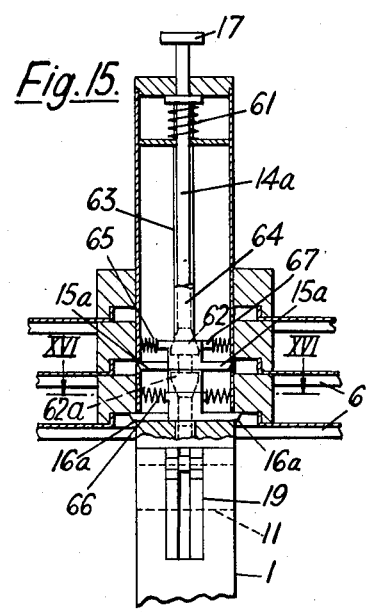
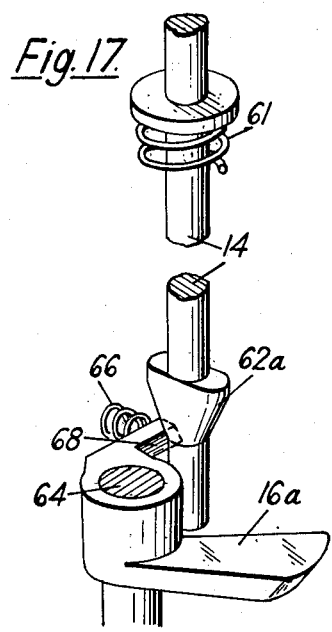
Inventor
George Henry Rainbow
By
Mason, Porter, Diller & Stewart
Attorneys May 10, 1966  G. H. RAINBOW  3,250,208
CAN HANDLING Filed April 7, 1964  11 Sheets-Sheet 10

Inventor
*George Henry Rainbow*
By
*Mason Porter, Diller & Stewart*
Attorneys

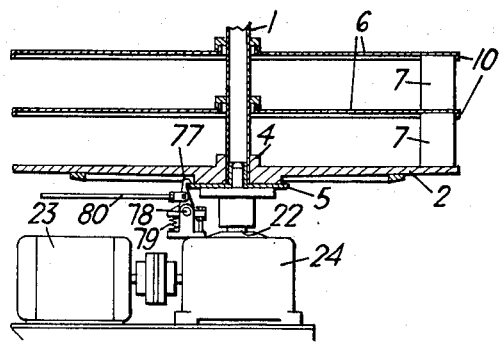
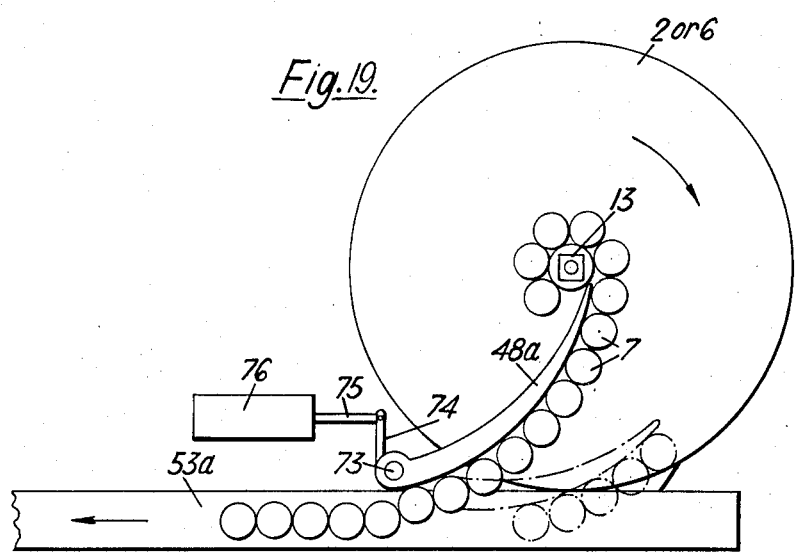

United States Patent Office 3,250,208
Patented May 10, 1966

3,250,208
CAN HANDLING
George Henry Rainbow, Gerrard's Cross, England, assignor to The Metal Box Company Limited, London, England, a British company
Filed Apr. 7, 1964, Ser. No. 357,938
29 Claims. (Cl. 99—371)

This invention relates to can handling when preparing the cans for cooking in a retort or subsequent to the removal thereof from the retort.

Cans are usually disposed in crates or baskets for inserting into a retort for cooking, the crate being made of metal and the cans arranged in the crate in superimposed layers separated by perforated separator plates. With the forms of crate known heretofore it has been necessary to create the layers from a single line of cans delivered in succession and to move each layer bodily on to a separator plate. It has also been necessary subsequent to the removal of the crate from the retort to unscramble each layer of cans and again to form them into a single line. Further, because of the mass of the crate the amount of heat required in the retort has necessarily had to be sufficient to raise the whole of the mass to the cooking temperature and this is greater than that which would be required if the crate could be dispensed with. The cooling time required before the crate can be removed from the retort has also been dependent on the mass to be cooked.

It is an object of the invention to provide a crate which can be loaded directly from a single line of cans delivered in succession and from which the cans may be removed from the separator plates one at a time into a single line thereof.

A further object of the invention is to provide a crate capable of receiving a separator plate magazine to avoid the necessity of manual manipulation of the plates relative to the crate.

A still further object of the present invention is to provide a crate which reduces the amount of metal framework required to a minimum thereby reducing the cost of the crate, the amount of heat required for cooking, and the time required for cooling.

According to the invention there is provided a retort crate for cans comprising a crate spindle one end of which is connectable with a rotatable driving spindle for rotation thereby, a base plate co-axial with the crate spindle and mounted thereon for rotation therewith and for axial movement relative thereto, a base plate locating member rotatable with the crate spindle and extending laterally therefrom at a position adjacent to said one end of the crate spindle to determine a lowermost position of the base plate when the crate spindle is vertical, and plurality of separator plates locatable about the crate spindle for rotation therewith and axial movement relative thereto, said separator plates being applicable in succession to the crate spindle from the end thereof opposite said one end and maintainable in spaced axial relation by cans located therebetween and resting upright on ends thereof. Each separator plate may be provided with a peripheral flange extending from the underside of the plate towards the base plate and arranged to embrace a batch of cans on the upper ends of which the separator plate is resting.

The crate may include a separator plate magazine connectable with the end of the crate spindle opposite said one end thereof, said magazine incorporating plate-supporting means arranged to support separator plates in superimposed relation for application to the crate spindle, and actuating means coupled to the plate-supporting means and operable to release separator plates supported thereby one at a time for axial movement on to the crate spindle to rest on the tops of a batch of cans located on the base plate or on another separator plate as appropriate.

The invention also contemplates a machine for moving cans relative to a crate as set forth above comprising a vertical driving spindle connectable with the crate spindle and supported for rotation about the axis thereof, means for rotatng the driving spindle, support means engageable with the underside of the crate base plate and operable to move the base plate axially of the crate spindle to and from a can dispensing position and to locate the base plate or a separator plate as appropriate at said position, and guide means co-operable with the base plate or with a separator plate as appropriate to guide cans in succession during movement thereof relative to the plate or separator plate and during rotation of the crate about the axis of the crate spindle.

The suport means may comprise a frame supported for movement in a vertical plane and having arms disposed on opposite sides of the driving spindle, freely rotatable rollers mounted on said arms for engagement with the underside of the crate base plate, and operating means coupled with said frame to effect movement thereof in said vertical plane and to retain the frame in positions thereof in which the base plate or a separating plate as appropriate is located at the dispensing position.

In another embodiment of the invention the guide means may comprise fixed guide elements tangential to to the crate and spaced apart to permit cans to be moved in succession on to the base plate or on to a separator plate as appropriate, and a stationary arcuate deflector co-operating with the guide elements and operable during movement of the cans with the base plate or separator plate to urge the cans towards the centre thereof whereby the cans are disposed thereon in concentric rows. The channel may be spring-urged towards the crate spindle.

In a still further embodiment of the invention the guide means comprises a deflector member supported for movement over the upper surface of the base plate or separator plate as appropriate in a direction substantially radial to the axis of rotation of the crate spindle thereby to extend successively into the concentric rows of cans supported by the base plate or separator plate so that rotation of the base plate or separator plate causes the cans to move lengthwise of the deflector off the base plate or separator plate, and reception means to receive cans leaving the base plate or separator plate.

Figure 2:
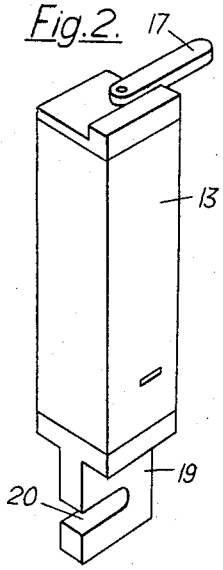
Figure 3:
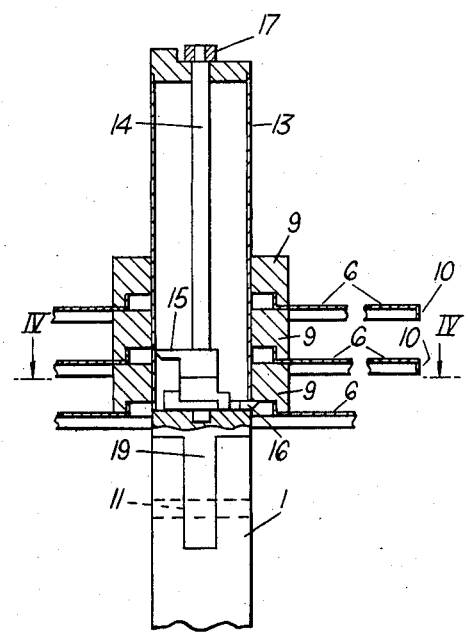
Figure 4:
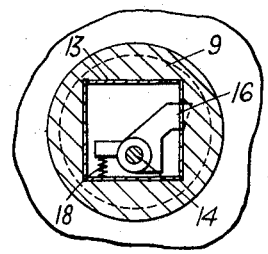
Figure 5:
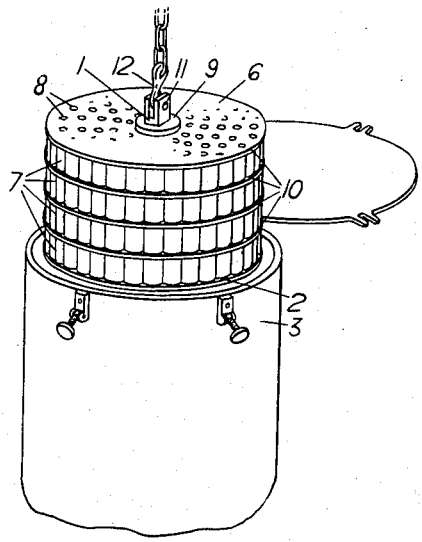
Figure 6:
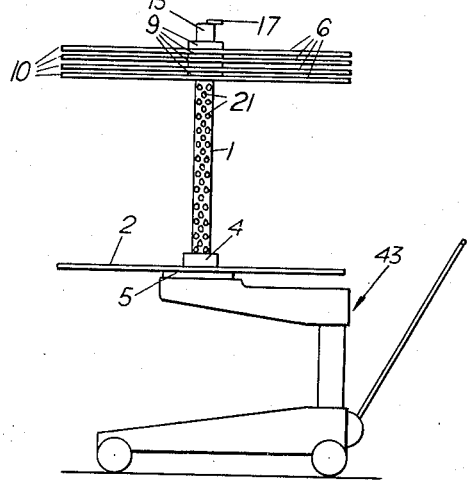
Figure 11:
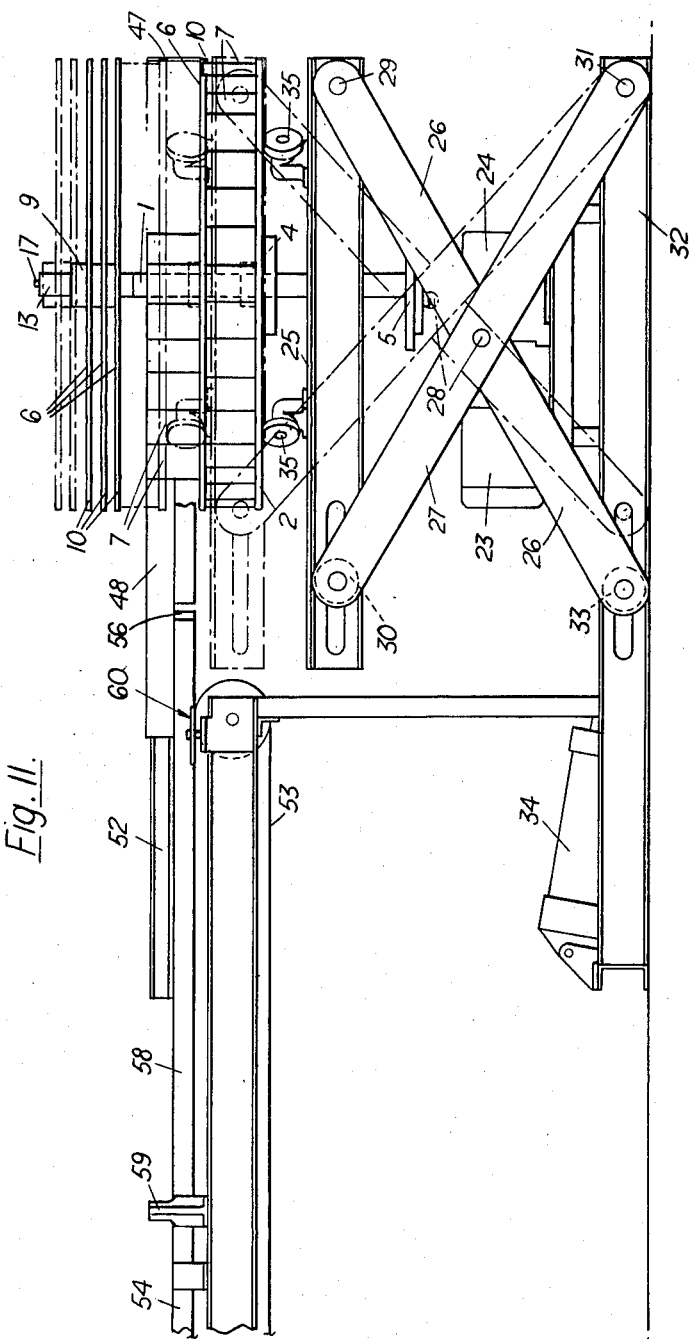
Figure 12:
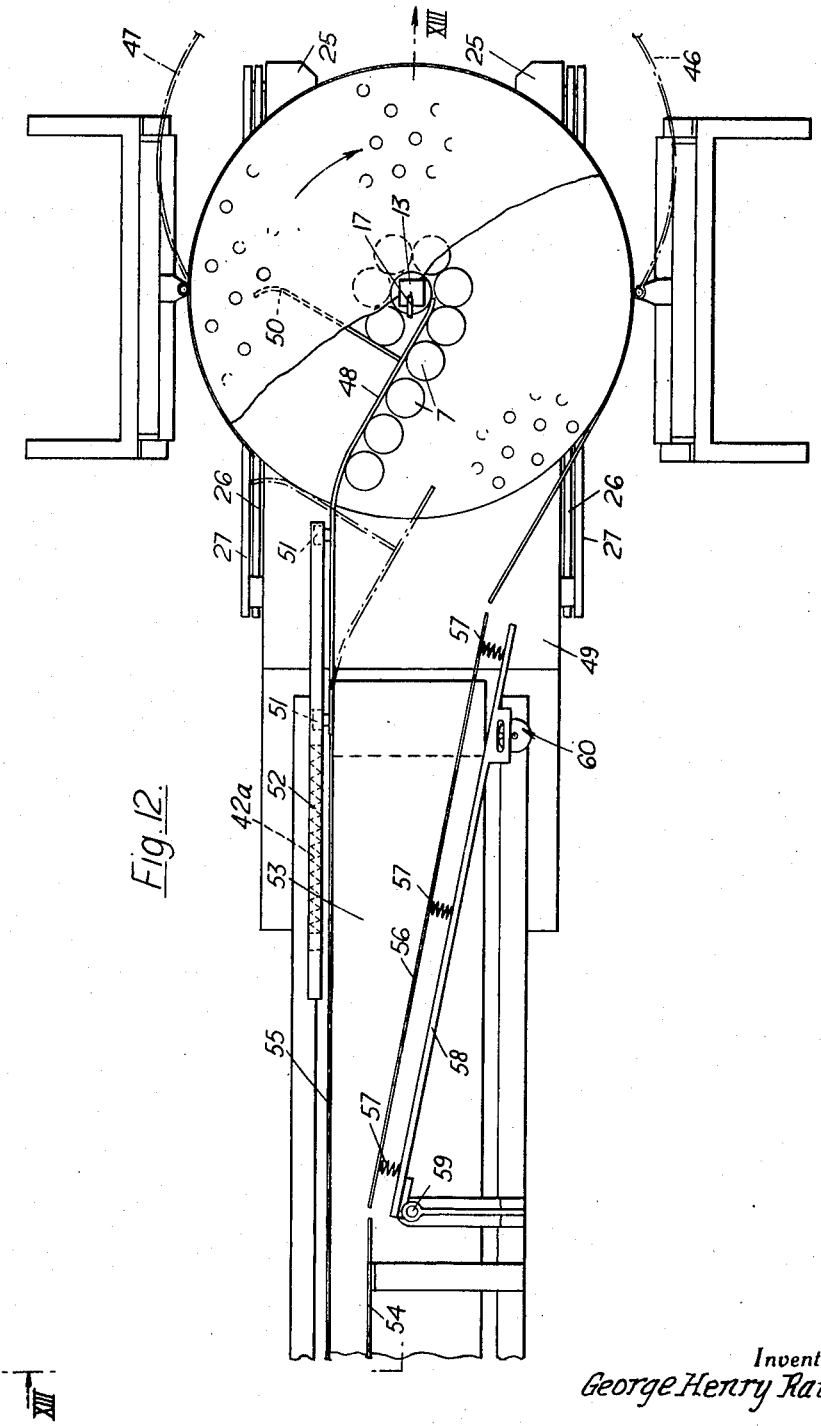
Figure 13:
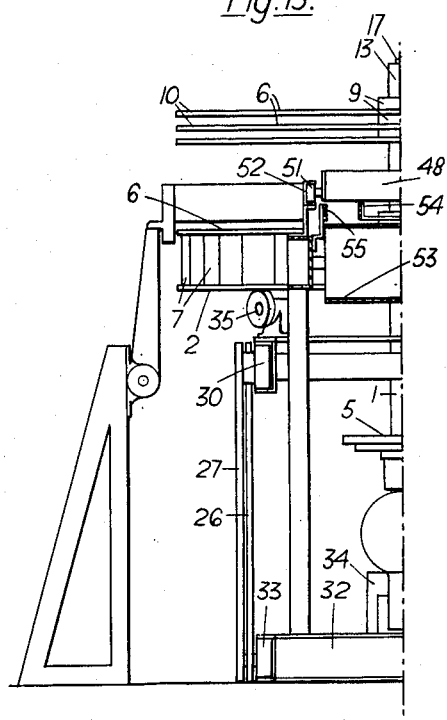
Figure 16:
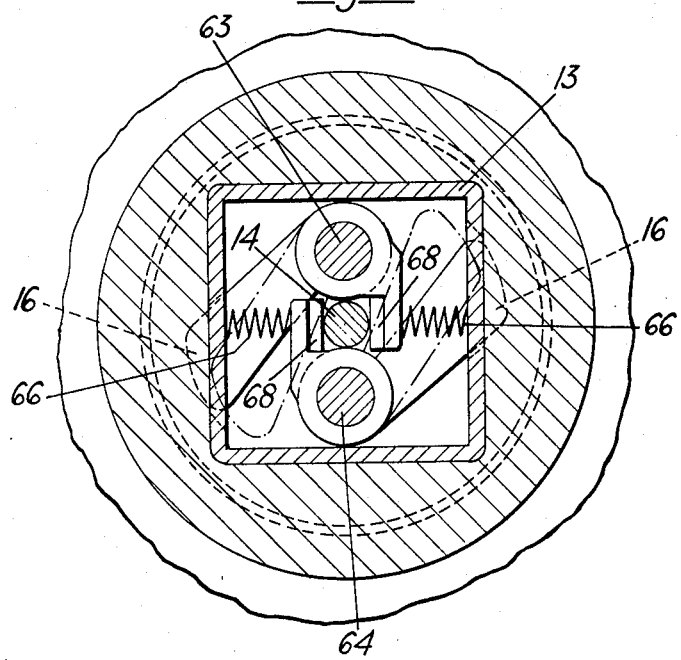
Figure 18:
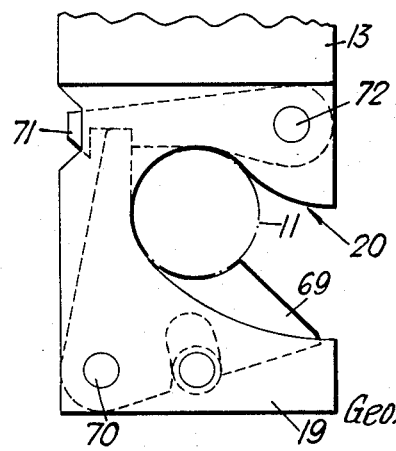

In order that the invention may be clearly understood some embodiments thereof will now be described, by way of example, with reference to the accompanying diagrammatic drawings, in which:

FIGURE 1 is a pictorial view of a loaded retort crate according to the invention, FIGURE 2 is a pictorial view of a separator plate magazine for use with the crate of FIGURE 1, FIGURE 3 is a section, to an enlarged scale, through the magazine and a part of the crate to which it is fitted, FIGURE 4 is a section on line IV—IV, FIGURE 3, FIGURE 5 is a pictorial view of a loaded crate being lowered into a retort, FIGURE 6 is an elevation of an empty crate supported on a forked trolley for disposition on a machine for loading the crate with cans, FIGURE 7 is an elevation, partly in section, of a machine for loading the crate with cans, FIGURE 8 is a top plan of FIGURE 7, FIGURE 9 is an end elevation looking in the direction of arrow IX, FIGURE 7, FIGURE 10 is a top plan of a modification to FIGURE 8, FIGURE 11 is an elevation, partly in section, and showing some of the parts in two different positions thereof, of a machine for unloading a crate, FIGURE 12 is a top plan of FIGURE 11, FIGURE 13 is a view on line XIII—XIII, FIGURE 12, FIGURE 14 is a pictorial view of an alternative form of a separator magazine, FIGURE 15 is a section, to an enlarged scale, through the magazine of FIGURE 14, FIGURE 16 is a section on line XVI—XVI, FIGURE 15, FIGURE 17 is a pictorial view of a part of FIGURE 15 illustrating the mode of operation thereof, FIGURE 18 is a view looking in the direction of arrow XVIII, FIGURE 14, FIGURE 19 is a top plan illustrating a modification to the machine shown in FIGURE 12, and FIGURE 20 illustrates a modified form of device for retaining the crate spindle in proper location with a spindle by which it is to be rotated.

FIGURE 21 is a cross-section illustrating the spindle base connection.

In the drawings like reference numerals indicate like or similar parts.

Referring to FIGURES 1 to 6, the retort crate comprises a crate spindle 1 one end of which is connectable, as described below, with a rotatable driving spindle for rotation thereby. The crate spindle 1 is of rectangular cross-section, preferably of square cross-section, and is hollow, said one end being provided with a bore of rectangular, preferably square, cross-section to fit over a similarly shaped end of the driving spindle. A circular base plate 2 is co-axial with the crate spindle 1 and is mounted thereon for rotation therewith and for axial movement relative thereto. The base plate 2 is provided with a plurality of apertures 8a which, when the crate is located in a retort 3, FIGURE 5, permit steam to pass through the base plate. A boss 4 extends from the upper face of the base plate 2 and has a square aperture passing therethrough to fit about the crate spindle 1 and permit axial movement of the base plate relative to the crate spindle. A base plate locating member formed as a flange 5 extends laterally from the crate spindle at a position adjacent to said one end of the spindle 1, is rotatable with the spindle 1, and locates the base plate 2 in the lowermost position thereof, FIGURE 6, when the crate spindle 1 is vertical, this being the normal position thereof.

The crate also includes a plurality of separator plates 6, four as shown in the drawings, locatable about the crate spindle 1 for rotation therewith and for axial movement relative thereto. The separator plates 6 are applicable in succession to the crate spindle 1 from the end thereof opposite said one end and are maintained in spaced axial relation by cans 7 located therebetween and resting upright on ends thereof, FIGURES 1 and 5. Each separator plate 6 is provided with a plurality of apertures 8 which, when the crate is located in the retort 3, permit steam to pass through the separator plate. Each separator plate 6 has a boss 9 integral with or secured to the upper face thereof and the boss has a square bore therethrough by which the separator plate is located about the crate spindle 1 for rotation therewith and axial movement relative thereto. Each separator plate 6 is also provided with a peripheral flange 10 which extends from the underside of the plate towards the base plate 2 and is arranged, as shown in FIGURES 1 and 5, to embrace a batch of cans 7 on the upper ends of which the separator plate is resting. The flanges 10 accordingly act to retain the cans in position in the crate.

The end of the crate spindle 1 opposite said one end thereof is a forked end and a pin 11 extends through the fork for engagement by the hook 12, FIGURE 5, of a lifting device, not shown, by which the crate when loaded with cans 7 can be lowered into or raised out of the retort 3. The capacity of the retort is usually such as to accommodate either two or three loaded crates superimposed one on the other in the retort.

The crate may include a separator plate magazine 13, FIGURES 2 to 4, connectable with the forked end of the crate spindle and arranged to support the separator plates 6 in superimposed relation, FIGURES 3 and 6, for application to the crate spindle 1 during loading of the crate. The magazine 13 incorporates plate-supporting means which comprises a rotatable rod 14, FIGURES 3 and 4, supported to be co-axial with the crate spindle 1 and a catch 15 and a release pawl 16 spaced apart axially of the rod 14 and rotatable therewith. The pawl 16 and catch 15 are operable respectively, on rotation of the rod 14 by a handle 17 secured thereto, to release the lowermost separator plate 6 for application to the crate spindle 1 and to restrain the next succeeding plate 6 against axial movement until the pawl 16 is restored, by counter-rotation of rod 14, when the said next succeeding separator plate 6 is released by the catch 15 for axial movement into engagement with the pawl 16.

The pawl 16 is urged by a spring 18, FIGURE 4, to the plate arresting or supporting position thereof, and the magazine 13 is provided with a portion 19, FIGURE 2, of rectangular cross-section arranged to fit in the fork opening at the top of the crate spindle 1. The portion 19 is slotted at 20 to pass about the pin 11 to retain the magazine in position on the crate spindle 1.

As mentioned above, the crate spindle 1 is a hollow spindle and it may be provided with apertures 21, FIGURE 6, which extend through the sides thereof and communicate with the interior of the spindle whereby when the loaded crate is housed in the retort 3 steam can pass from the spindle between cans loaded on the crate.

FIGURES 7 to 9 diagrammatically illustrate a machine for loading a crate as described above. The machine comprises a vertical driving spindle 22 supported for rotation about the axis thereof and the upper end of the driving spindle is of square cross-section to fit in the lower end of the crate spindle 1. The driving spindle 22 is driven by an electric motor 23 through a drive unit 24 and support means are engageable with the underside of the crate base plate 2 and are operable to move the base plate axially of the crate spindle 1 to and from a can dispensing position and to locate the base plate 2 or a separator plate 6, as appropriate, at said position. The support means comprises a frame supported for movement in a vertical plane and having arms 25 disposed on opposite sides of the driving spindle 22, see FIGURE 8. The frame is carried by toggle links 26, 27 pivoted at 28, and the frame is mounted at the upper ends of the links, the links 26 being pivoted at 29 to the arms 25 and the links 27 provided with rollers 30, FIGURE 9, which run in grooves in the arms 25. The lower ends of links 27 are pivoted at 31 to fixed frame members 32 and the lower ends of links 26 are provided with rollers 33 to run in channels formed by the members 32. The frame 25 is movable in the vertical plane by operating means, shown as a hydraulic cylinder 34, connected to the lower ends of the links 26.

Guide means are arranged to co-operate with the base plate 2 or with a separator plate 6, as appropriate, at the dispensing position. As shown in FIGURE 7 a separator plate 6 is located at the dispensing position, the base plate 2 having already been loaded with a layer of cans 7 and lowered by the frame 25 from said position. The frame 25 carries freely rotatable rollers 35 on which the base plate 2 rests for rotation by the co-operating crate spindle 1 and driving spindle 22.

The guide means guide cans 7 in succession during movement thereof relative to the base plate 2 or separator plate 6, as appropriate, and during rotation of the crate, counter-clockwise as viewed in FIGURE 8, by the spindles 1 and 22. While cans are being loaded at the dispensing position the base plate 2, or separator plate 6, is retained in this position by the hydraulic cylinder 34.

As shown in FIGURES 7 to 9, the guide means comprise a guide channel 36, 37 formed in continuation of fixed guides 38, 39 and pivoted at 40 for pivotal movement relative to the base plate 2 or separator plate 6 as appropriate. Cans 7 are moved in succession one at a time towards and on to the base plate 2, or separator plate 6, by conveyor means formed by endless chains 41. The channel 36, 37 is urged by a spring 42 towards the create spindle 1.

When an empty crate is to be loaded a magazine 13 and separator plates 6 are fitted to the top of the crate spindle 1 and the empty crate is moved by a fork truck 43, FIGURE 6, to a position at which the lower end of the crate spindle can be connected to the upper end of the driving spindle 22. At this time the frame 25 is in the lowermost position thereof. When the spindle 1 is connected to spindle 22 a latching device 44, FIGURES 7 and 21, is engaged in a peripheral groove formed in the crate spindle 1 thereby to retain the spindle 1 in proper relation with spindle 22. The operating means is operated to raise the frame 25 and the base plate 2 to the dispensing position and motor 23 is then started to rotate the base plate. At the commencement of loading the guide element 36 is adjacent to the crate spindle and as the cans are moved by the base plate 2 they are engaged with the guide element 36 and are caused thereby to be formed into concentric rows as shown in FIGURE 8, the element 36 being gradually moved outwards about pivot 40 against the action of spring 42.

When the base plate is fully loaded rotation thereof is stopped, handle 17 is operated to release a separator plate 6 from pawl 16 of the magazine and to allow the next separator plate to descend on to the pawl 16. The released separator plate slides down crate spindle 1 and rests on the tops of the cans on base plate 2, FIGURE 7, and the operating means 34 is operated to lower the base plate to the position shown in FIGURE 7 so that the separator plate 6 is in position to receive a layer of cans.

The cycle of operation is repeated until the crate is fully loaded when the latching device 44 is released and the truck 43 is employed to remove the loaded crate from the driving spindle 22 and to transport it to a retort 6.

FIGURE 10 illustrates a modification to the machine as shown in FIGURE 8 in that the guide means 38, 39 are disposed to be tangential to the create and a stationary arcuate deflector 45 is provided to urge the cans towards the centre of the base plate, or separator plate, as the concentric rows comprising the layer of cans are built up. The deflector 45 is carried by a hinge connection 35a to permit it to be moved out of the path of the base plate 2, or of a separator plate 6, except when a layer of cans is being formed thereon.

Hinged guide rails 46, 47 are provided to embrace the crate while it is being located on the driving spindle 22.

FIGURES 11 to 13 diagrammatically illustrate a machine for unloading cans from a crate. This machine is similar in many respects to that described above for loading operations but the driving spindle 22 is rotated in a clockwise direction as viewed in FIGURE 12.

In this machine the guide means comprises a deflector member 48 supported for movement over the upper surface of the base plate 2, or separator plate 6, in a direction substantially radial to the axis of rotation of the crate spindle 1 thereby to extend successively into the concentric rows of cans supported by the base plate 2, or separator plate 6, so that rotation thereof causes the cans to move lengthwise of the deflector member 48 off the base plate, or separator plate, and on to reception means formed by a dead plate 49, FIGURE 12.

The deflector member 48 is fitted with a bar 50 arranged to sweep cans off the base plate, or separator plate, and the bar is so mounted on the deflector member that when the member 48 is in the innermost position thereof, FIGURE 12, the bar is spaced from the crate spindle 1 by a distance equal to the diameter of a can.

The deflector member 48 has freely rotatable rollers 51 mounted thereon and arranged to run on a fixed guide 52 and member 48 is urged by a spring 42a located within the guide or other such appropriate place, towards the crate spindle 1.

Cans deposited on the dead plate 49 are moved by succeeding cans on to conveyor means 53 which move them away from the dead plate. Spaced guide members 54, 55 permit the cans to be moved in succession in a single line by the conveyor means and a jostling device jostles the cans into the single row formation thereof. The jostling means comprises a flexible guide rail 56 attached by springs 57 to a rocking bar 58 which is pivoted at 59 and is rocked by a rotatable eccentric device 60.

The loaded crate is mounted on the machine in the manner described above from a trolley 43 and the upper separator plate 6 is raised and pushed upwards past the pawl 16 of the magazine. The frame 25 is raised to bring the second separator plate, which supports the upper layer of cans, to the dispensing position. The cans are removed by the rotation of the crate and the action of the member 48 projecting successively into the rows under the action of the controlling spring and when all of the cans have been removed from the separator plate rotation of the crate is stopped, the deflector member 48 is restored to the starting position thereof, the empty separator plate is raised above the pawl 16 on to the magazine, and the cycle is then repeated. The empty crate is removed from the machine by the trolley 43.

FIGURES 14 to 18 illustrate an alternative form of separator magazine in which rod 14a is supported for axial sliding movement against the action of a spring 61, FIGURE 15. The outer end of the rod 14a is fitted with a handle 17 and the inner end carries release cams 62, 62a. In this from of the magazine the catch 15a and the release pawl 16a are supported for independent rotation about the axes of pins 63, 64 against the action of return springs 65, 66 and are respectively provided with cam followers 67, 68 for co-operation with the release cams 62, 62a. The arrangement of the cam followers 67, 68 is such that they lie one above the other so that when the rod 14a is depressed axially by pressure applied to the handle 17 the release cams 62, 62a simultaneously co-operate with the two cam followers 67, 68 and turn the catch 15a and the release pawl 16a so that one separator plate 6 is released by the catch 15a for axial movement into engagement with the pawl 16a and the separator plate resting on the pawl 16a is released to slide on to the spindle 1.

In this embodiment of the separator magazine the slot 20 in the portion 19 is of arcuate shape and is provided with a retaining pawl 69, FIGURES 14 and 18, which is pivoted at 70, FIGURE 18. A catch 71 pivoted at 72 is provided to retain the pawl 69 in the position thereof, FIGURE 18, in which it retains the magazine engaged with the pin 11 on the crate spindle 1.

FIGURE 19 illustrates a modification which may be made to the machine illustrated in FIGURES 11 to 13. According to this modification the deflector member 48 is replaced by a deflector member 48a which is pivoted at 73. The member 48a is rockable about the pivot 73 by a link 74 connected to the piston rod 75 of a hydraulic cylinder 76. Clockwise movement, as viewed in FIGURE 19, of the member 48a moves cans 7 from the base plate 2 or a separator plate 6, as appropriate, on to a conveyor 53a which moves the cans in single file.

FIGURE 20 illustrates a modification of the device for retaining the crate spindle 1 in proper relation with the spindle 22. According to this modification to latching device 44 is dispensed with and is replaced by a latch 77 which is pivoted at 78 to be urged into latching relation with the flange 5 by a spring 79. A link 80 is connected to the latch 77 and when pulled, to the left as viewed in FIGURE 20, releases the latch 77 from flange 5 against the action of spring 79.

I claim:

1. A retort crate for cans comprising a crate spindle one end of which is connectable with a rotatable driving spindle for rotation thereby, a base plate co-axial with the crate spindle and mounted thereon for rotation therewith and for axial movement relative thereto, a base plate locating member rotatable with the crate spindle and extending laterally therefrom at a position adjacent to said one end of the crate spindle to determine a lowermost position of the base plate when the crate spindle is vertical, and a plurality of separator plates locatable about the crate spindle for rotation therewith and axial movement relative thereto, means for successively applying said separator plates to the crate spindle from the end thereof opposite said one end and maintainable in spaced axial relation by cans located therebetween and resting upright on ends thereof.

2. A retort crate according to claim 1, wherein the crate spindle is a hollow spindle and is provided with apertures extending through the sides thereof and communicating with the interior of the spindle whereby when the loaded crate is housed in a retort steam can pass from the spindle between cans loaded on the crate.

3. A retort crate according to claim 1, wherein said means to apply said separator plates includes a separator plate magazine connectable with the end of the crate spindle opposite said one end thereof, said magazine incorpoarting plate-supporting means arranged to support separator plates in superimposed relation for application to the crate spindle, and actuating means co-operating with the plate-supporting means and operable to release separator plates supported thereby one at a time for axial movement on to the crate spindle to rest on the tops of a batch of cans located on the base plate or on another separator plate as appropriate.

4. A retort crate according to claim 3, wherein the plate-supporting means comprises a catch and a release pawl spaced apart axially and supported for rotation by said actuating means respectively to release the lowermost separator plate for application to the crate spindle and to restrain the next succeeding separator plate against axial movement until the pawl is restored when said next succeeding separator plate is released by the catch for axial movement into engagement with the pawl.

5. A retort crate according to claim 4, wherein the actuating means comprises a rod supported for rotation about the axis thereof and a handle connected to the rod to effect rotation thereof, said catch and release pawl being rotatable with said rod.

6. A retort crate according to claim 4, wherein the catch and the release pawl are supported for independent rotation against the action of springs into and out of the path of the separator plates and the actuating means comprises a rod supported for axial movement against the action of spring, release cams movable with the rod, and cam followers movable respectively with said catch and said release pawl and arranged to cooperate with said release cams to effect rotation of the catch and the release pawl against the action of the springs co-operating therewith.

7. A retort crate according to claim 1, wherein the crate spindle is of rectangular cross-section and the base plate and separator plates are each provided with an aperture of like cross-section permitting sliding movement thereof axially of the crate spindle and location thereof relative to the crate spindle for rotation therewith.

8. A retort crate according to claim 7, wherein the crate spindle is of square cross-section.

9. A retort crate according to claim 8, wherein the end of the crate spindle opposite said one end thereof is a forked end and a pin extends through the fork for engagement by the hook of a lifting device by which the crate when loaded with cans can be lowered into or raised out of a retort.

10. A retort crate according to claim 7, wherein the end of the crate spindle opposite said one end thereof is a forked end and a pin extends through the fork for engagement by the hook of a lifting device by which the crate when loaded with cans can be lowered into or raised out of a retort.

11. A retort crate according to claim 1, wherein each separator plate is provided with a peripheral flange extending from the underside of the separator plate towards the base plate and arranged to embrace a batch of cans on the upper ends of which the separator plate is resting.

12. A retort crate according to claim 11, including a separator plate magazine connectable with the end of the crate spindle opposite said one end thereof, said magazine incorpoarting plate-supporting means arranged to support separator plates in superimposed relation for application to the crate spindle, and actuating means co-operating with the plate-supporting means and operable to release separator plates supported thereby one at a time for axial movement on to the crate spindle to rest on the tops of a batch of cans located on the base plate or on another separator plate as appropriate.

13. A retort crate according to claim 11, wherein the crate spindle is of rectangular cross-section and the base plate and separator plates are each provided with an aperture of like cross-section permitting sliding movement thereof axially of the crate spindle and location thereof relative to the crate spindle for rotation therewith.

14. A retort crate according to claim 11, wherein the crate spindle is a hollow spindle and is provided with apertures extending through the sides thereof and communicating with the interior of the spindle whereby when the loaded crate is housed in a retort steam can pass from the spindle between cans loaded on the crate.

15. A machine for moving cans relative to a retort crate, said retort crate being of the type including a crate spindle one end of which is connected with a rotatable driving spindle for rotation thereby, a base plate coaxial with the crate spindle and mounted thereon for rotation therewith and for axial movement relative thereto, a base plate locating member rotatable with the crate spindle and extending laterally therefrom at a position adjacent to said one end of the crate spindle to determine a lowermost position of the base plate when the crate spindle is vertical, and a plurality of separator plates rotatable about the crate spindle for rotation therewith and axial movement relative thereto, means for successively applying said separator plates to the crate spindle from the end thereof opposite said one end and maintainable in spaced axial relation by cans located therebetween and resting upright on the ends thereof, said machine comprising a vertical driving spindle connectable with the crate spindle and supported for rotation about the axis thereof, means for rotating the driving spindle, support means engageable with the underside of the crate base plate and operable to move the base plate axially of the crate spindle to and from a can dispensing position and to locate the base plate or a separator plate as appropriate at said position, and guide means cooperable with the base plate or with a separator plate as appropriate to guide cans in succession during movement thereof relative to the base plate or separator plate during rotation of the crate about the axis of the crate spindle.

16. A machine according to claim 15, wherein the support means comprises a frame supported for movement in a vertical plane and having arms disposed on opposite sides of the driving spindle, freely rotatable rollers mounted on said arms for engagement with the underside of the crate base plate, and operating means coupled with said frame to effect movement thereof in said vertical plane and to retain the frame in positions thereof in which the base plate or a separator plate as appropriate is located at the dispensing position.

17. A machine according to claim 16, wherein said guide means comprises fixed elements tangential to the crate and spaced apart to permit cans to be moved in succession on to the base plate or on to a separator plate as appropriate, and a stationary arcuate deflector cooperating with the guide elements and operable during movement of the cans with the base plate or separator plate to urge the cans towards the centre thereof whereby the cans are disposed thereon in concentric rows.

18. A machine according to claim 16, wherein said guide means comprise a guide channel supported for pivotal movement relative to the base plate or separator plate as appropriate, said channel permitting movement of cans therealong one at a time in succession on to the base plate or separator plate as cans delivered thereto are formed into concentric rows about the crate spindle by rotation with the base plate or separator plate.

19. A machine according to claim 16, including conveyor means operable to deliver cans in succession one at a time to the guide means.

20. A machine according to claim 16, wherein the guide means comprises a deflector member supported for movement over the upper surface of the base plate or separator plate as appropriate and arranged to project into the rows of cans supported by the base plate or a separator plate and to cooperate with the base plate or separator plate during rotation thereof thereby to cause cans to move off the base plate or separator plate, and conveyor means to receive cans leaving the base plate or separator plate.

21. A machine according to claim 15, wherein said guide means comprises fixed elements tangential to the crate and spaced apart to permit cans to be moved in succession on to the base plate or on to a separator plate as appropriate, and a stationary arcuate deflector co-operating with the guide elements and operable during movement of the cans with the base plate or separator plate to urge the cans towards the centre thereof whereby the cans are disposed thereon in concentric rows.

22. A machine according to claim 15, wherein said guide means comprise a guide channel supported for pivotal movement relative to the base plate or separator plate as appropriate, said channel permitting movement of cans therealong one at a time in succession on to the base plate or separator plate as cans delivered thereto are formed into concentric rows about the crate spindle by rotation with the base plate or separator plate.

23. A machine according to claim 22, wherein the channel is spring-urged towards the crate spindle.

24. A machine according to claim 15, including conveyor means operable to deliver cans in succession one at a time to the guide means.

25. A machine according to claim 15, wherein the guide means comprises a deflector member supported for movement over the upper surface of the base plate or separator plate as appropriate and arranged to project into the rows of cans supported by the base plate or a separator plate and to co-operate with the base plate or separator plate during rotation thereof thereby to cause cans to move off the base plate or separator plate, and conveyor means to receive cans leaving the base plate or separator plate.

26. A machine according to claim 25, wherein the deflector member is movable in a direction substantially radial to the axis of rotation of the crate spindle to project successively into concentric rows of cans supported by the base plate or a separator plate, and reception means is interposed between the crate and the conveyor means to receive cans leaving the base plate or the separator plate prior to movement thereof on to the conveyor means.

27. A machine according to claim 26, including guide members co-operating with the conveyor means to cause the cans to be received and moved thereby in succession as a single row.

28. A retort crate for cans comprising a crate spindle one end of which is connectable with a rotatable driving spindle for rotation thereby, a base plate coaxial with the crate spindle and mounted thereon for rotation therewith, a base plate locating member rotatable with the crate spindle and extending laterally therefrom at a position adjacent to said one end of the crate spindle to determine a lowermost position of the base plate when the crate spindle is vertical, and a plurality of separator plates locatable about the crate spindle for rotation therewith, means for successively applying said separator plates to the crate spindle from the end thereof opposite said one end and maintainable in spaced axial relation by cans located therebetween and resting upright on the ends thereof.

29. A retort crate for cans comprising a crate spindle one end of which is connectable with a rotatable driving spindle for rotation thereby, a base plate coaxial with the crate spindle and mounted thereon for rotation therewith and for axial movement relative thereto, and a plurality of separator plates locatable about the crate spindle for rotation therewith and axial movement relative thereto, means for successively applying said separator plates to the crate spindle from the end thereof opposite said one end and maintainable in spaced axial relation by cans located therebetween and resting upright on the ends thereof.

References Cited by the Examiner

UNITED STATES PATENTS

| 885,332 | 4/1908 | Forhan | 99—371 |
|---|---|---|---|
| 1,447,135 | 2/1923 | Hoy | 99—360 |
| 1,480,186 | 1/1924 | Smith | 99—371 X |
| 1,485,851 | 3/1924 | Hopper | 99—371 X |
| 1,670,619 | 5/1928 | Hagen et al. | 99—371 |
| 1,850,480 | 3/1932 | Sledge et al. | 214—310 |
| 1,975,073 | 10/1934 | Chapman | 99—371 |
| 2,506,661 | 5/1950 | Busse | 99—371 |
| 3,022,913 | 2/1962 | Vincent et al. | 214—310 |

FOREIGN PATENTS 290,555  10/1928  Great Britain.

IRVING BUNEVICH, *Primary Examiner.*

BILLY J. WILHITE, *Examiner.*